United States Patent [19]
Jang

[11] Patent Number: 5,328,303
[45] Date of Patent: Jul. 12, 1994

[54] AUTOMATIC SPINDLE MOVING DEVICE FOR TAPPING/DRILLING MACHINE

[76] Inventor: Kwan S. Jang, 146 Sam-dong (5th Woosung Apt. Bldg. 102, 190 520), Euiwang-shi, Kyeonggi-do, Rep. of Korea

[21] Appl. No.: 943,816

[22] Filed: Sep. 11, 1992

[30] Foreign Application Priority Data

Sep. 27, 1991 [KR] Rep. of Korea ............ 91-16832

[51] Int. Cl.$^5$ .................................. B23B 41/00
[52] U.S. Cl. .................................. 408/14; 408/17; 408/135; 408/137
[58] Field of Search ............ 408/14, 17, 135, 136, 408/137; 409/232, 234, 233

[56] References Cited

U.S. PATENT DOCUMENTS

| | | | |
|---|---|---|---|
| 2,887,344 | 5/1959 | Hause | 408/135 X |
| 3,802,792 | 4/1974 | Quackenbush | 408/137 X |
| 3,837,757 | 9/1974 | Levine | 408/14 |
| 4,128,361 | 12/1978 | Gelwas et al. | 408/137 |
| 5,149,232 | 9/1992 | Eckman | 408/137 |

Primary Examiner—Z. R. Bilinsky
Attorney, Agent, or Firm—James D. Hall

[57] ABSTRACT

An improved automatic spindle moving device for a tapping/drilling machine is disclosed. A worm is formed on a spindle in an elongate form in the lengthwise direction thereof, and a pair of worm wheels are meshed with the worm, while the worm wheels are supported by horizontal shafts. A braking means is installed on the leading end of the horizontal shaft, so that the worm wheels can be braked, thereby reducing the revolution speed of the spindle. The power corresponding to the revolution speed reduction is converted to elevating or lowering the spindle, so that the spindle should move up and down. Thus repeated automatic continuous tapping is rendered possible, and the up and down movements of the spindle can be arbitrarily adjusted. Further, during a drilling operation, holes can be drilled to a uniform depth repeatedly, while a pedal can be utilized in tapping or drilling. Thus tapping internal threads and drilling holes are rendered more convenient and easier.

2 Claims, 15 Drawing Sheets

AUTOMATIC SPINDLE MOVING DEVICE FOR TAPPING/DRILLING MACHINE

FIELD OF THE INVENTION

The present invention relates to a tapping/drilling machine, and particularly to an automatic spindle moving device for a tapping/drilling machine, in which a spindle with a chuck attached thereon can be moved up and down automatically, when drilling a hole by using a drilling tool, or when forming threads by means of a tapping tool.

BACKGROUND OF THE INVENTION

The spindle moving device of the conventional drilling machine or drilling/tapping machine consists of a rack gear and a pinion meshed therewith. That is, a vertically movable tube is made to move up and down by manipulating a moving handle which is laterally connected to the pinion.

An automatic spindle moving device is disclosed in Japanese Utility Model Publication No. Sho-51-30064, and No. Sho-57-39127. In these devices, a separate pulley or a motor is used as the driving power source, and a plurality of worms and worm wheels have to be meshed to each other.

Further, as disclosed in Korean Utility Model Publication No. 1983-302 (which has almost the same constitution as that of Japanese Utility Model No. Sho-58-37526) and in Korean Utility Model Publication N.o 1979-1963, the clutch mechanism of the handle is complicated, and, if a fast moving is to be made possible, separate pneumatic and hydraulic cylinders are required as the driving means. Further, there are required an electronic circuit for controlling the pneumatic and hydraulic cylinders, an air compressor, a hydraulic pump, and hydraulic path tubes. Therefore, the device is magnified in its bulk, becomes complicated in its constitution, and is stepped up in its price.

Further, as disclosed in Japanese Utility Model Publication No. Sho-60-35532, a link or the like is used in moving the vertically movable tube up and down, and this has been the generally prevalent application.

For example, when drilling a hole into a work piece by a drilling machine, a large hole cannot be drilled at one time, and therefore, several rounds of drilling have to be performed starting from a small hole and increasing the size of the hole at each round thereafter in order to drill a single large hole. Further, when drilling holes repeatedly to the same depth, the descending level of the spindle has to be indirectly adjusted by bringing down the spindle to the bottom by means of a manual handle, and by adjusting the tip of the drilling tool to the work piece. Further, when drilling a deep hole, if the drilling is carried out continuously, the spaces around the drilling tool is filled with the chips, thereby increasing the drilling resistance. Consequently, the drilling tool can be broken off, or can be heated to such a degree that the life expectancy of the drilling tool is shortened. If such a phenomenon is to be avoided, the drilling has to be performed several times step by step. As the hole is drilled deeper and deeper, the spindle moving handle has to be pulled down alternately with the other hands, with the result that the drilling operation becomes very troublesome.

Particularly, in the case where the work piece is composed of copper or aluminum, a cooling fluid has to be supplied by one hand and so on, with the result that the work efficiency is significantly decreased.

Meanwhile, when carrying out a tapping, the tapping tool has to be brought down to the work piece by manipulating the moving handle, and, once the tapping tool enters into the hole to be tapped, the tapping tool itself advances within the hole in order to form threads, without requiring further manipulating of the moving handle. However, when tapping threads of small pitches, if the tapping tool is let to advance for itself within the hole, a precision tapping cannot be performed, and, on the other hand, even if the moving handle is manually manipulated, the moving speed becomes non-constant, with the result that the internal threads thus formed cannot be firmly coupled with a bolt.

SUMMARY OF THE INVENTION

The present invention is intended to overcome the above described disadvantages of the conventional techniques.

Therefore it is the object of the present invention to provide an automatic spindle moving device for a drilling/tapping machine, in which holes can be drilled to the same depth repeatedly, a large hole can be easily drilled with a small force, and the vertically moving speed of the spindle can be arbitrarily adjusted.

In achieving the above object, the spindle moving device for a drilling/tapping machine includes: a worm formed longitudinally on the spindle (which is the revolution shaft of the drilling/tapping machine); two worm wheels meshed with the worm and installed by means of two horizontal shafts; a braking means of an electronic type, a drum type, a disc type or a band type, installed on the leading end thereof; a vertically movable tube accommodating the spindle so as for it to move up and down; and a depth adjusting rod having an adjusting bolt and installed on a side of the vertically movable tube in order to make it possible to drill holes to the same depth repeatedly.

In the above, the braking means can be made to brake by manipulating a moving handle, so that the revolution speed of the spindle can be reduced, and that the kinetic energy corresponding to the reduced revolution speed should be transmitted to moving the vertically movable tube up and down.

BRIEF DESCRIPTION OF THE DRAWINGS

The above object and other advantages of the present invention will become more apparent by describing in detail the preferred embodiment of the present invention with reference to the attached drawings in which:

FIGS. 17A to 17C illustrate the braking means of the present invention in a simple form, in which:

FIG. 17A illustrates the case where the spindle is fixed, and the drum hub is rotated anti-clockwise;

FIG. 17B illustrates the case where the drum hub is fixed, and the spindle is rotated in the direction of the arrow mark; and FIG. 17C illustrates the case where the spindle is rotated, and the drum hub is rotated anti-clockwise as in the normal operating state.

DESCRIPTION OF THE PREFERRED EMBODIMENT

Figure 1:
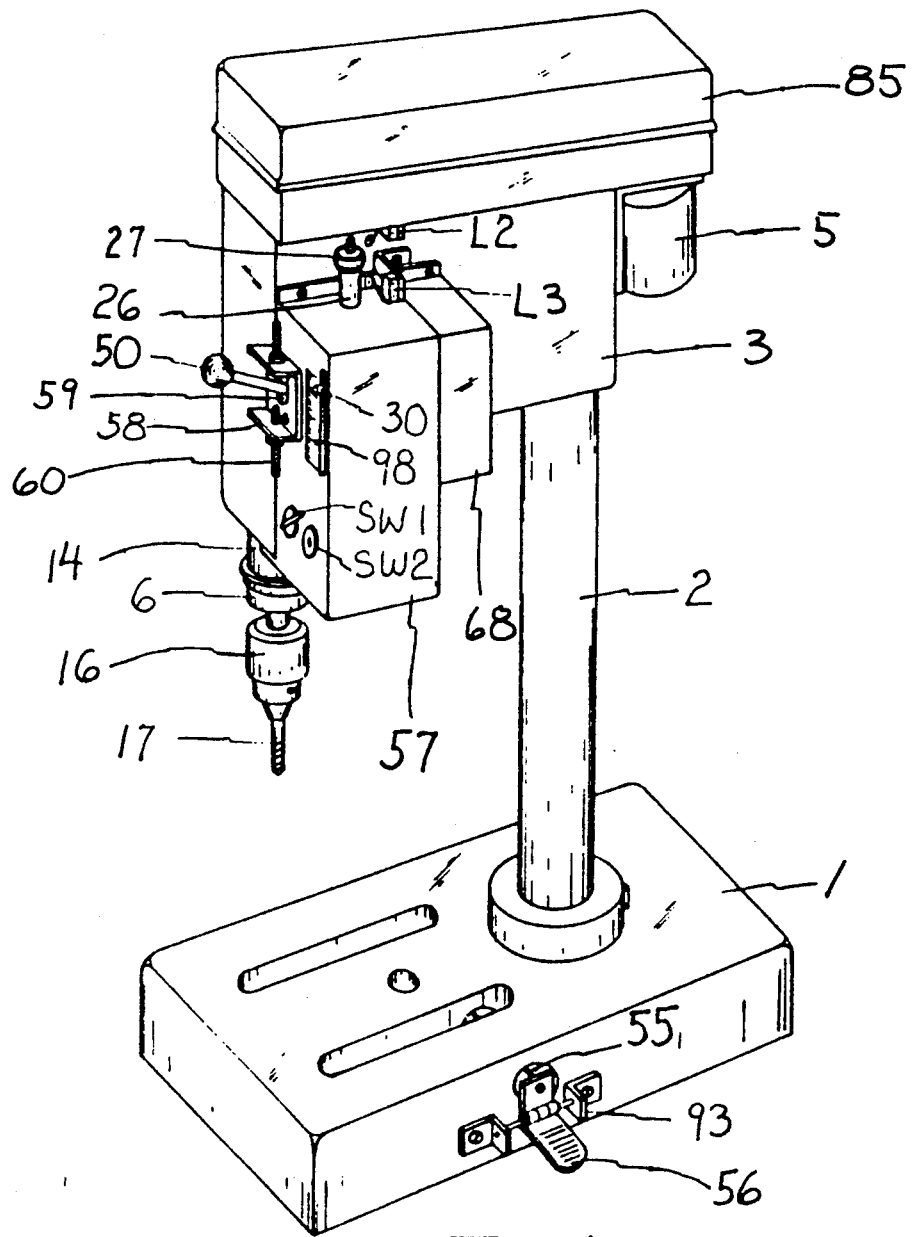
FIG. 1 is a perspective view of the drilling/tapping machine using a drum type braking means according to the present invention.

The spindle moving device according to the present invention includes a drill head portion 3—3, and, first, this will be described referring to the drawings.

Reference code 1 indicates a table of the drilling machine, 2 a supporting pole, and 3 a drill head installed on the upper end portion of the supporting pole 2. Reference codes 3a and 3b indicate spaces formed in the drill head 3, and reference code 5 indicates a motor installed on the drill head 3, a driving pulley 86 being installed on a shaft 5a of the motor 5.

Reference code 6 indicates a spindle revolving within a vertically movable tube 14. The cross section of the upper portion of the spindle 6 is rectangular and forms a rectangular portion 7, and the spindle 6 passes through the bottom of a hollow shaft 11a which supports a passive pulley 11, while a worm 8 is formed on the intermediate portion of the spindle 6 in an elongate form in the longitudinal direction. Two horizontal shafts 10 pass through a vertically elongate slot 15 which is formed on the vertically movable tube 14 which is accommodated within the space 3a of the drill head 3. The horizontal shafts 10 support worm wheels 9 which mesh with the worm 8, and one end of each of the horizontal shafts 10 is selectively attached with a drum hub 18, an armature hub 19, a disc hub 20 or a band hub 21. The lower end of a compression coil spring 12 contacts with the bottom of the hollow shaft 11a, while the upper end of the spring 12 contacts with a snap ring 13 which is inserted under the rectangular portion 7 of the spindle 6. A bearing 90 and a spacer 95 are inserted into the space 3b of the drill head 3, and they are supported by means of a bearing cover 91 and a screw 92. Then the hollow shaft 11a is inserted into it, and the hollow shaft 11a is supported by a snap ring 88, so that the hollow shaft 11a can revolve, and that the spindle 6 can receive power from the motor while moving up and down.

Meanwhile, a depth adjusting rod 22 is threadably secured into the upper portion of the vertically movable tube 14 after passing through an elongate slot 4 which is formed on a side of the drill head 3 in a longitudinally elongate form. A threaded portion 23 which is formed on the other end of the depth adjusting rod 22 is threadably coupled with an adjusting bolt 24, thereby preventing the loosening of a circular pole shaped lock nut 26. A knob 27 is installed on the upper circumferential surface of the lock nut 26 in such a manner as to press a pair of limiting switches L2 and L3 which are secured on a side of the drill head 3 in a movable form. A movable knob 28 is secured to the lower circumferential surface of the lock nut 26 by means of a screw 29 in order to prevent the spindle 6 from being departed from its moving range, by pressing a pair of limiting switches L4 and L5 which are secured on a side of the drill head 3.

The lower end of the adjusting bolt 24 forms a cone 25 so as for it to press an actuation lever 46, and an indicator 30 having a riveting portion 31 is inserted into the upper portion of the cone 25, and is secured by means of a pin 32. A scale 98 is printed on the right front face of a braking means box 57, so that the drilling or tapping levels, i.e., the vertical level of the spindle 6, can be visually observed. From a side of the drill head 3, there are projected a projecting pin 47 for supporting the actuation lever 46, a projecting pin 46a for limiting the actuation of the actuation lever 46, and a projecting pin 48a for serving as a shaft of a spring 48 for supporting the actuation lever 46.

Reference code 48b indicates a projecting pin for supporting an end of the spring 48, 54a a pin, 85 a belt cover, and 87 a belt. Further, reference codes 88, 88a and 89 indicate snap rings, 90a, 100 and 100a bearings, 93 and 93a fixed plates, and 93b, 102 and 105 screws. Further, reference code 94 indicates a key, 94a a screw, 96 a rivetting, 99 a bolt, and 101 a bearing cover, while reference codes 103, 103a and 104 indicate snap rings.

Second, the drum braking means 5—5 of the present invention, which is installed on the leading end of the horizontal shaft 10 of the worm wheel 9, is constituted as described below. That is, an actuation bar 34 which is interlocked with the actuation lever 46 slides up and down within slots of two guide plates 33 and 33a. A wing piece 35 having a lining 36 is provided in a lateral form on the middle portion of the actuation bar 34, so that the wing piece 35 should press the circumferential surface of the drum hub 18. A compression coil spring 39 is inserted into the lower portion of the actuation bar 34, and is secured by means of a washer 37 and a pin 38. The lower end of the compression coil spring 39 is made to contact with a washer 37, and the upper end of the compression coil spring 39 is made to contact with the bottom of the guide plate 33a, in such a manner that the actuation bar 34 should be able to press a stopper 40. The two guide plates 33 and 33a and the stopper 40 are secured on a side of the drill head by means of screws 97, 97a and 97b.

On the upper portion of the actuation bar 34, there is installed an oscillating plate 41 having a rectangular hanger hole 42 on it and supported by a spring 45, in such a manner that the plate 41 should oscillate around a shaft 44. From the oscillating plate 41, there projects a supporting piece 43, so that the oscillating plate 41 should be prevented from being folded toward a branch rod 51 which is threadably secured into a manual handle 50. The manual handle 50 is secured to a shaft 49 which is threadably secured into a side of the drill head 3, and the manual handle 50 is provided with a branch rod 51 and another branch rod 52 so as for them to actuate together with the manual handle 50. Further, the manual handle 50 projects to the outside after passing through a vertical hole 58 of an adjusting plate 58 which is secured to the front face of the braking means box 57 by means of screws. Elongate bolts 60 which are secured by means of lock nuts 61 on the upper and lower faces of the adjusting plate 58 can be arbitrarily adjusted up and down, so that the manual handle 50 can be adjusted to any desired positions.

Pins 52a and 52b project from a side of the drill head 3, and one end of a tension spring 52c is secured by means of the pin 52a, while the other end of the spring is secured by means of the branch rod 52. Meanwhile, the original position of the manual handle 50 is decided by the pin 52b, and, at such an original position, the end of the branch rod 51 is engaged with the hanger hole 42 of the oscillating plate 41. Meanwhile, the limiting switch L1 is secured on a side of the drill head 3 in such a manner as to be pressed by a pressing protuberance 53 which is formed on the bottom of the branch rod 52. Thus if the manual handle 50 is pressed down slightly during drilling, the limiting switch L1 is turned on, so that the motor 5 should revolve forwardly. Under this condition, if the manual handle 50 is pressed slightly more, the actuation bar 34 moves up by the branch rod 51 which is inserted into the hanger hole 42. Consequently, a lining 36 presses the outer circumferential surface of the drum hub 18.

Wires 55 which are guided by rollers 54 are connected between the branch rod 52 and a pedal 56 which is secured to a table 1 by means of a pin 56a. Thus, if the pedal 56 is pressed, the same result as pressing down the manual handle 50 is effected, and an electric circuit for this operation is illustrated in FIG. 12.

Figure 12:
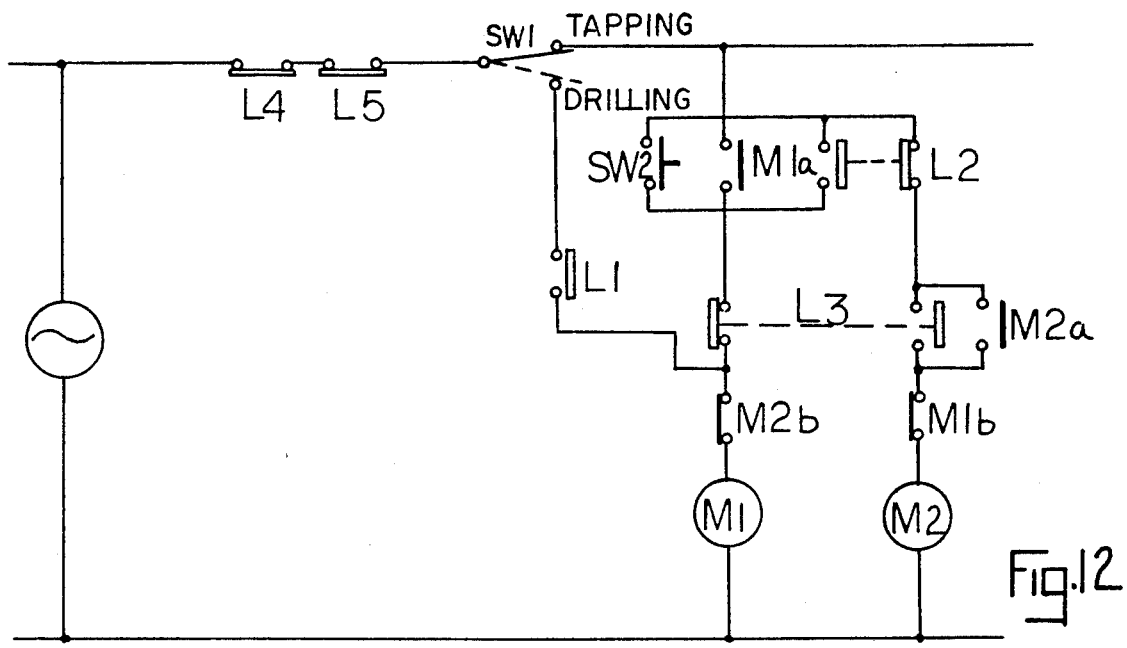
FIG. 12 illustrates the circuit of the machine of FIG. 1.

Referring to FIG. 12, reference code SW1 indicates a tapping/drilling shifting switch, and SW2 indicates a push button for activating the tapping mode. Further, $M_1$ indicates a forward revolution magnet switch, and $M_2$ indicates a reverse revolution magnet switch. Further, $M_{1-a}$ and $M_{1-b}$ indicate contacts a and b for $M_1$ respectively, and $M_{2-a}$ and $M_{2-b}$ indicate contacts a and b for $M_2$ respectively, while these components are accommodated within an electric circuit box 68.

Third, The constitution of the electronic braking means 11—11 will be described, and this is installed on the leading end of the horizonal shaft 10 of the worm wheel 9 according to the present invention, using the usual electronic brake. An armature hub 19 instead of the drum hub 18 is installed on the leading end of the horizontal shaft 10, and a stator 62 is installed on a side of the drill head 3 by means of screws 62a opposingly facingly with the armature 19, thereby forming a gap a. Here, reference code 63 indicates a coil, 65 a lining, 64 an armature, and 66 a flat spring.

Figure 13:
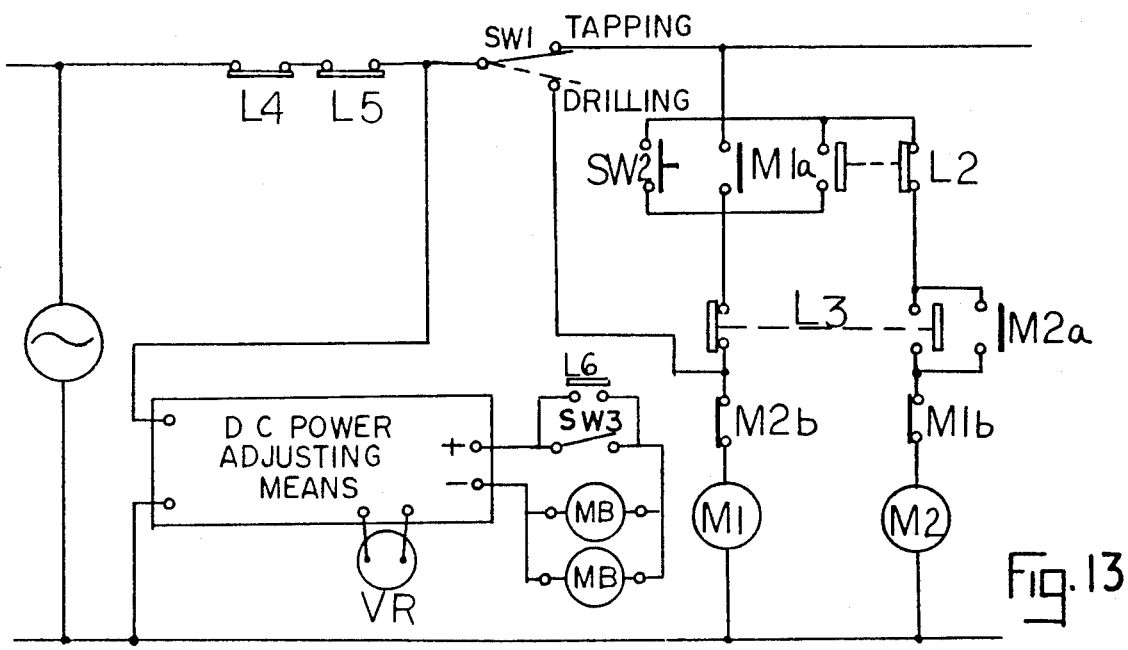
FIG. 13 illustrates the circuit of the machine of FIG. 9.

The electronic braking means according to the present invention is driven by the electric circuit of FIG. 13, while the circuit for driving the motor 5 forwardly and reversely is illustrated in FIG. 12. When the machine is shifted to a drilling mode, the shifting switch SW1 is made to be connected such that the forward revolution magnet switch $M_1$ should be activated. A known variable resistor VR which is used in the device of the present invention is for adjusting the current and voltage of a dc power source for the electronic brake MB. A known dc power adjusting means including the variable resistor VR is installed within a circuit box 68, and this is constituted as described below. That is, a pedal switch L6 and a snap switch SW3 are connected in parallel, and these are connected in series with a pair of electronic brake MB. This circuit is connected to an output terminal (+ and −) of the dc power adjusting means, and reference code 67 is a lead line of the pedal switch L6.

Figure 14:
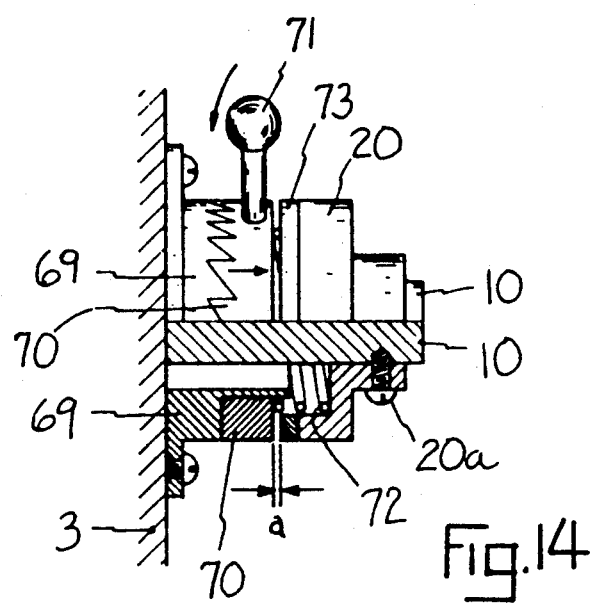
FIG. 14 is a partly sectional view of the disc type braking means according to the present invention, in which a teeth type brake is used.
Figure 15:
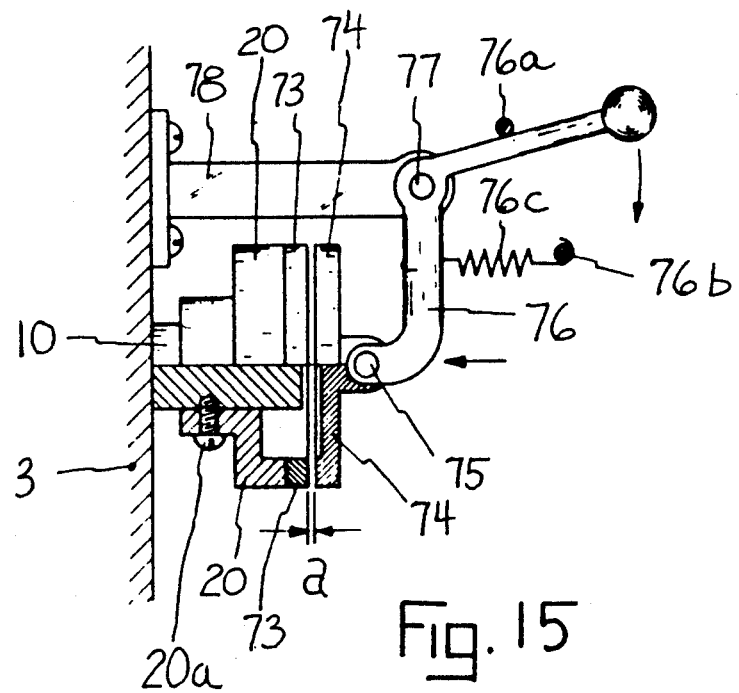
FIG. 15 is a partly sectional view of the disc type braking means according to the present invention, in which a disc type brake is used.
Figure 16:
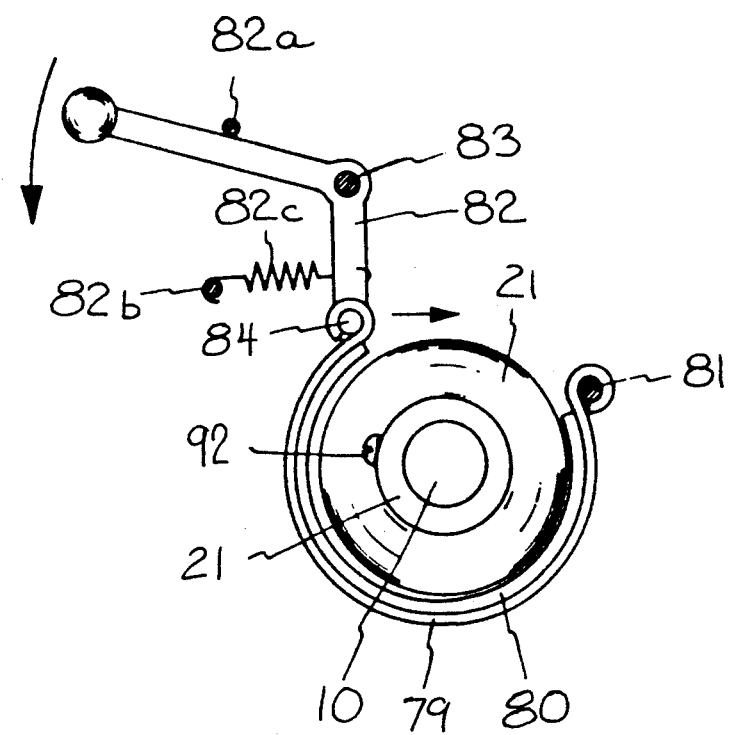
FIG. 16 is a view of the banding type braking means according the present invention.

Fourth, descriptions will be made on a disc braking means D which is installed on the leading end of the horizontal shaft 10 of the worm wheel 9 according to the present invention. A saw teeth type brake is illustrated in FIG. 14, while a lever brake is illustrated in FIG. 15. Referring to FIG. 14, a disc hub 20 is secured on the leading end of the horizontal shaft 10, a fixed teeth portion 69 is threadably secured to the drill head 3 in an inwardly facing form, and a movable teeth portion 70 is capable of sliding relative to the fixed teeth portion 69, thereby forming the saw teeth type brake. Further, a handle 71 is secured to the movable teeth portion 70, and a compression coil spring 72 is installed between the inner circumferential surface of the disc hub 20 and the movable teeth portion 70, thereby forming a gap a.

Referring to FIG. 15, a disc brake 74 is installed opposingly facingly with the disc hub 20 which is secured on the leading end of the horizontal shaft 10, and the disc brake 74 is secured on a lever 76 by means of a pin 75, the lever 76 being pivoted around a fulcrum 77. Reference code a indicates a gap, and 78 indicates a supporting bar fixed to the drill head 3, while 76a and 76b indicate a pin for limiting the movements of the lever 76, and a pin for securing one end of a tension spring 76c respectively, these pins being attached on the drill head 3. Further, reference code 20a indicates a screw and 73 a lining.

Fifth, descriptions will be made on a band braking means E which is attached on the leading end of the horizontal shaft 10 of the worm wheel 9 according to the present invention.

That is, a lining 80 is attached on a band 79 in such a manner that the lining 80 should contact with the outside circumferential surface of a band hub 21, the band hub 21 being secured on the leading end of the horizontal shaft 10. One side of the band 79 is secured by a shaft 81 which is secured on the drill head 3, while the other end of the band 79 is secured to one end of a lever 82 by means of a pin 84, the lever 82 being pivoted around a fulcrum 83. Reference codes 82a and 82b indicate a projected pin for limiting the pivoting of the lever 82, and a projected pin for securing one end of a tension spring 82c respectively, these pins being secured on the drill head 3.

The device of the present invention constituted as above will now be described as to its operations.

Figure 2:
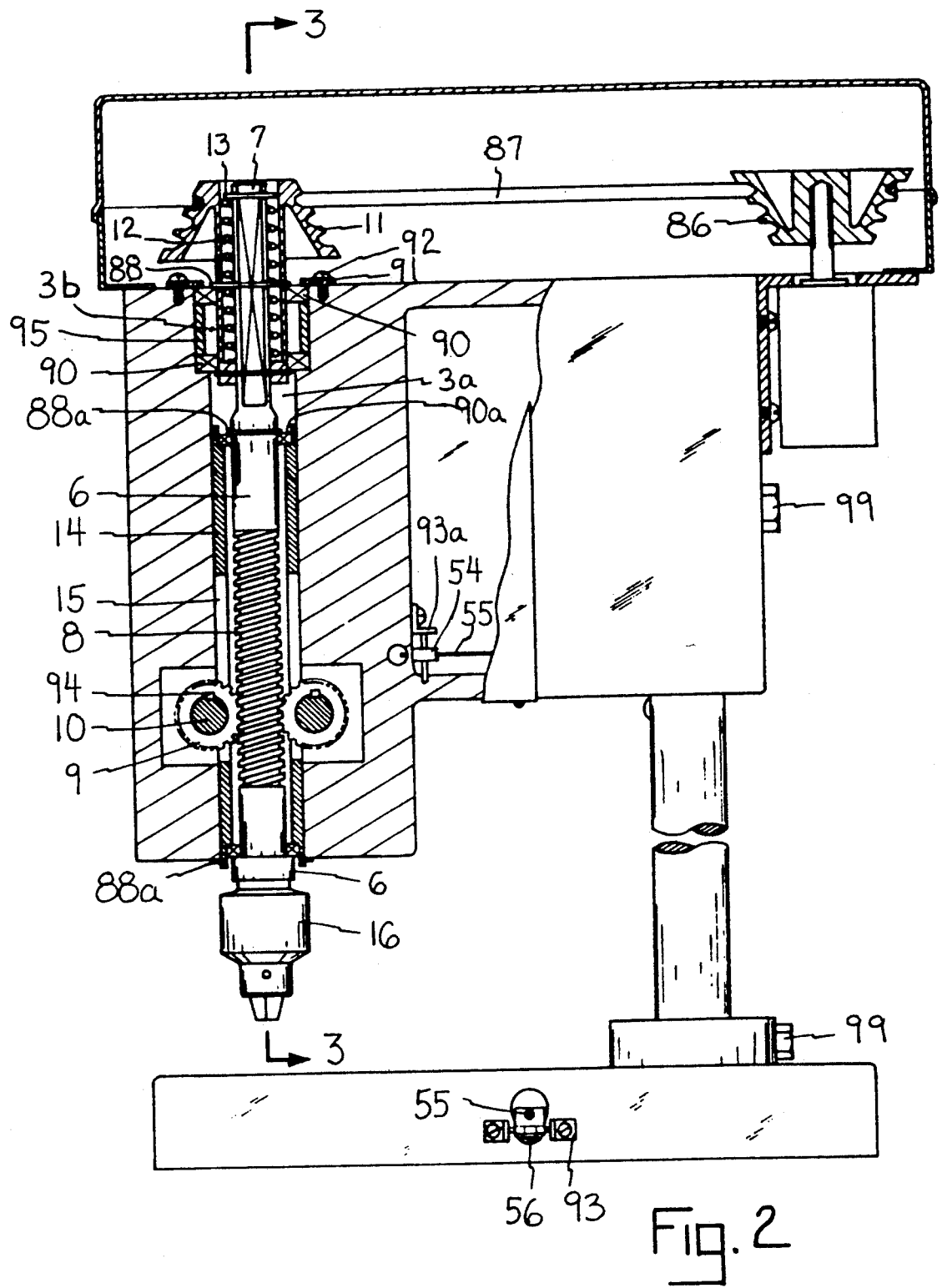
FIG. 2 is a side sectional view showing the drill head portion of the machine of FIG. 1.
Figure 3:
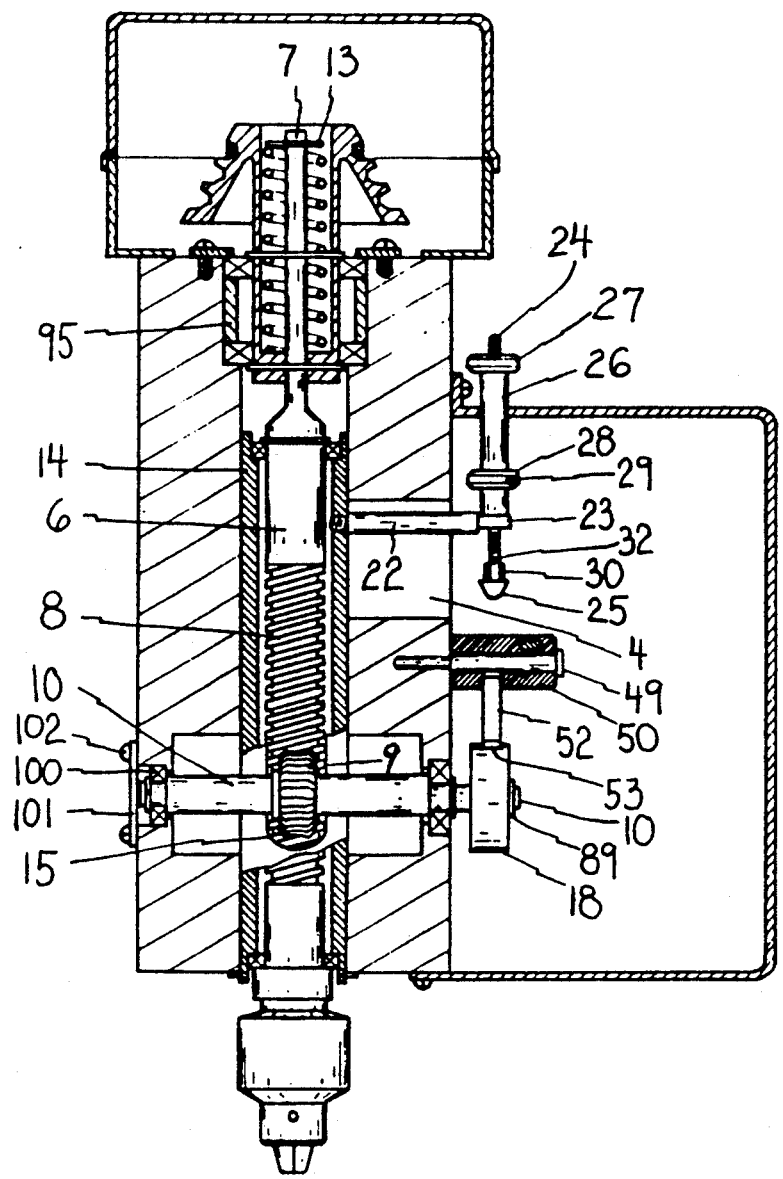
FIG. 3 is a frontal sectional view taken along the line 3—3 of FIG. 2 and showing the drill head portion of the machine of FIG. 1.
Figure 17A:
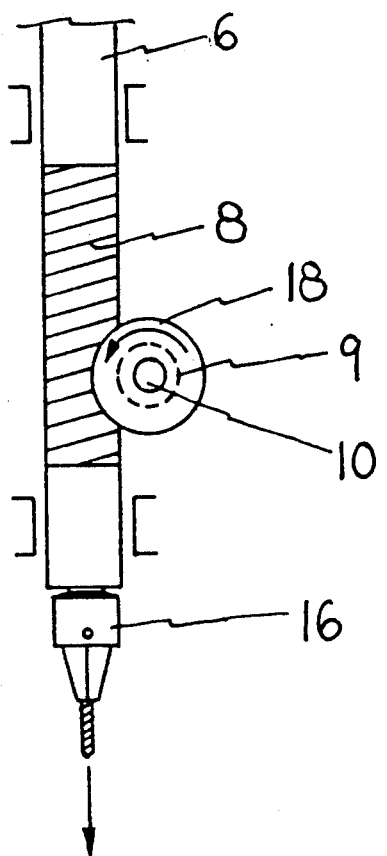
Figure 17B:
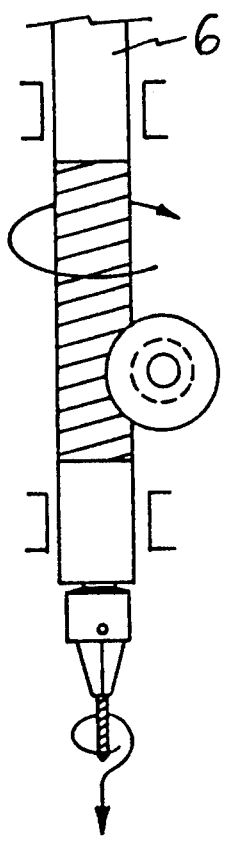

As shown in FIGS. 2 and 3, if the passive pulley 11 is driven by the motor 5, the spindle 6 on which rightward threads are formed receives revolution power at a certain speed ratio relative to the drum hub 18, the power being transmitted through the worm 8, the worm wheel 9, the horizontal shaft 10 and the drum hub 18. For example, as shown in FIG. 17A, if the drum hub 18 is rotated anti-clockwise (in the direction of the arrow mark), with the spindle 6 being stopped, then the spindle 6 comes down. On the other hand, as shown in FIG. 17B, if only the spindle 6 is let to revolve in the direction of the arrow mark, with the drum hub 18 being stopped, then the spindle 6 revolves and comes down. Further, as shown in FIG. 17C, if the spindle 6 is let to revolve in the direction of the arrow mark, the drum hub 18 revolves clockwise at a certain speed ratio.

Figure 17C:
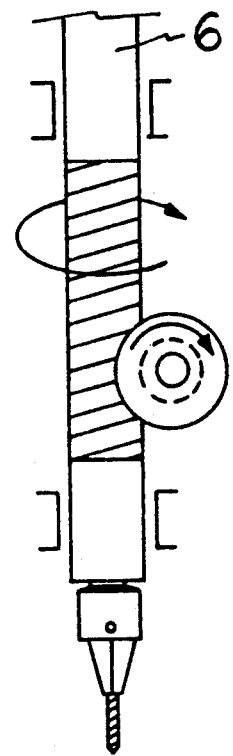

If a slight braking is applied on the drum hub 18 under the state of FIG. 17C, then the drum hub 18 revolves clockwise more slowly as much as braked. In other words, as shown in FIG. 17A, the drum hub 18 revolves anti-clockwise relative to the spindle 6 as much as the amount of the reduced speed, with the result that the spindle 9 revolvingly descends. If a continuous braking is applied, the spindle 6 will continuously descend.

For example, if it is assumed that the speed reduction ratio between the worm wheel 9 and the worm 8 of the spindle 6 is 30:1, and that the pitch of the worm 8 is 5 mm, then 30 revolutions of the spindle 6 should result in one revolution of the worm wheel 9, because it has 30 teeth. However, if a braking is applied such that only as much as 29 teeth is revolved (29/30 revolutions), then the revolution amount corresponding to one tooth (1/30 revolutions) is converted to lowering the spindle 6 as much as 5 mm.

Further, if a braking is applied such that 28 teeth of the worm wheel 9 are revolved during 30 revolutions of the spindle 6, then the spindle 6 will come down by 10 mm. Under this condition, if the revolution speed of the spindle 6 is 300 rpm, the spindle 6 will come down at a speed of 100 mm/min.

That is, depending on the magnitude of the braking, the descending speed of the spindle 6 becomes different. If the braking is released, the spindle 6 ascends by the force of the compression coil spring 12 to return to the original position.

According to the present invention as described above, one of the various braking means is attached on the leading end of the horizontal shaft 10 in such a manner that the spindle 6 should come down. The braking force can be increased by increasing the contact areas of the linings 36, 65, 73 and 80.

The braking methods are various, and some typical ones will be presented below as actual examples.

<Example 1>

The drum braking means B is as follows.

Figure 6:
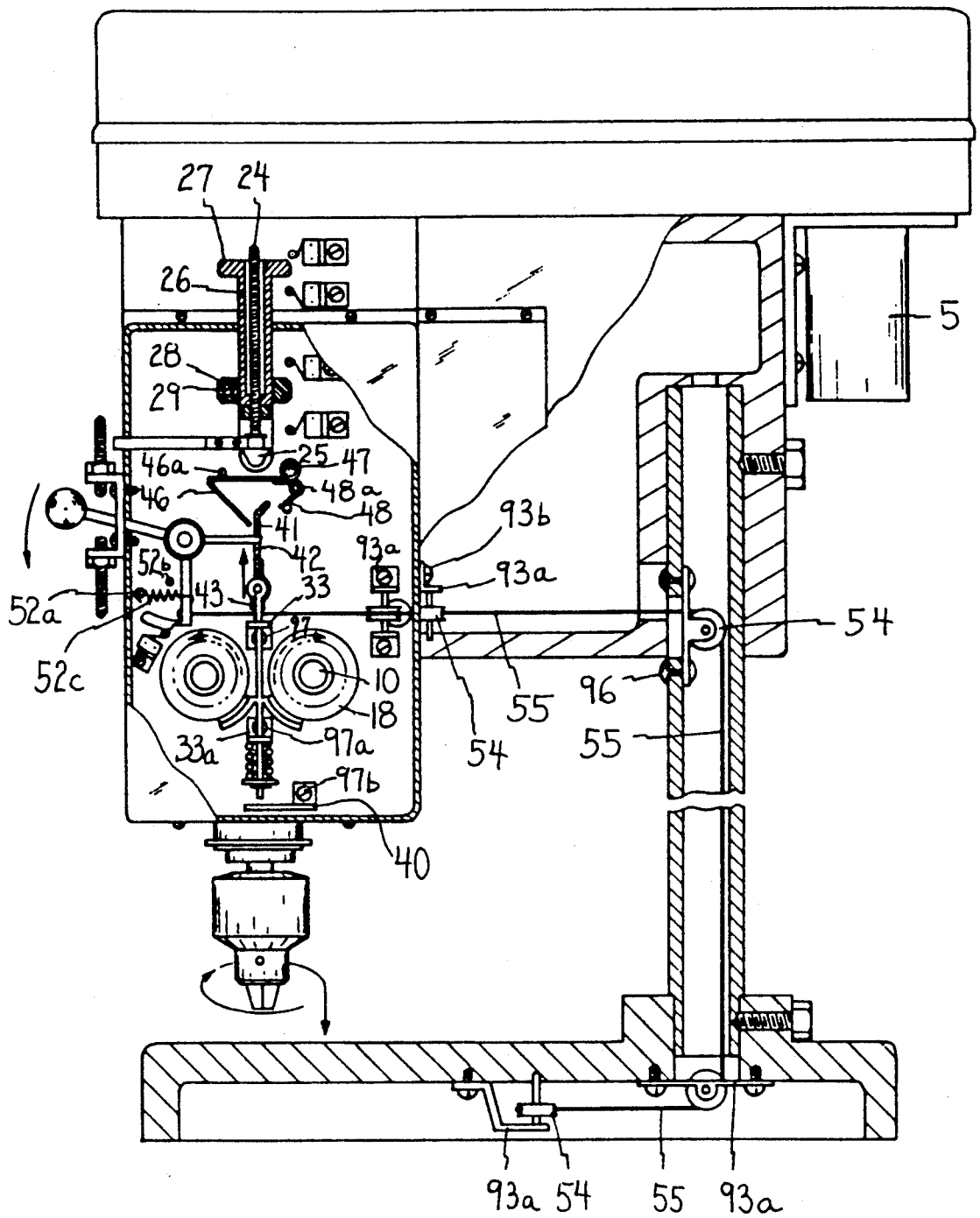
FIG. 6 is a plan view of the drum type braking means of the present invention showing a state in which the handle is pressed.

The shifting switch SW1 is set to a drilling mode, and then, the manual handle 50 is pulled down. Then as illustrated in FIGS. 6 and 12, the limiting switch L1 is closed (turned on), so that the forward revolution magnet switch $M_2$ should be activated, and that the motor 5 should revolve forwardly. At the same time, the actuation bar 34 ascends, so that the lining 36 should press the outer circumferential surface of the drum hub 18, and consequently that the spindle 6 should come down.

Figure 4:
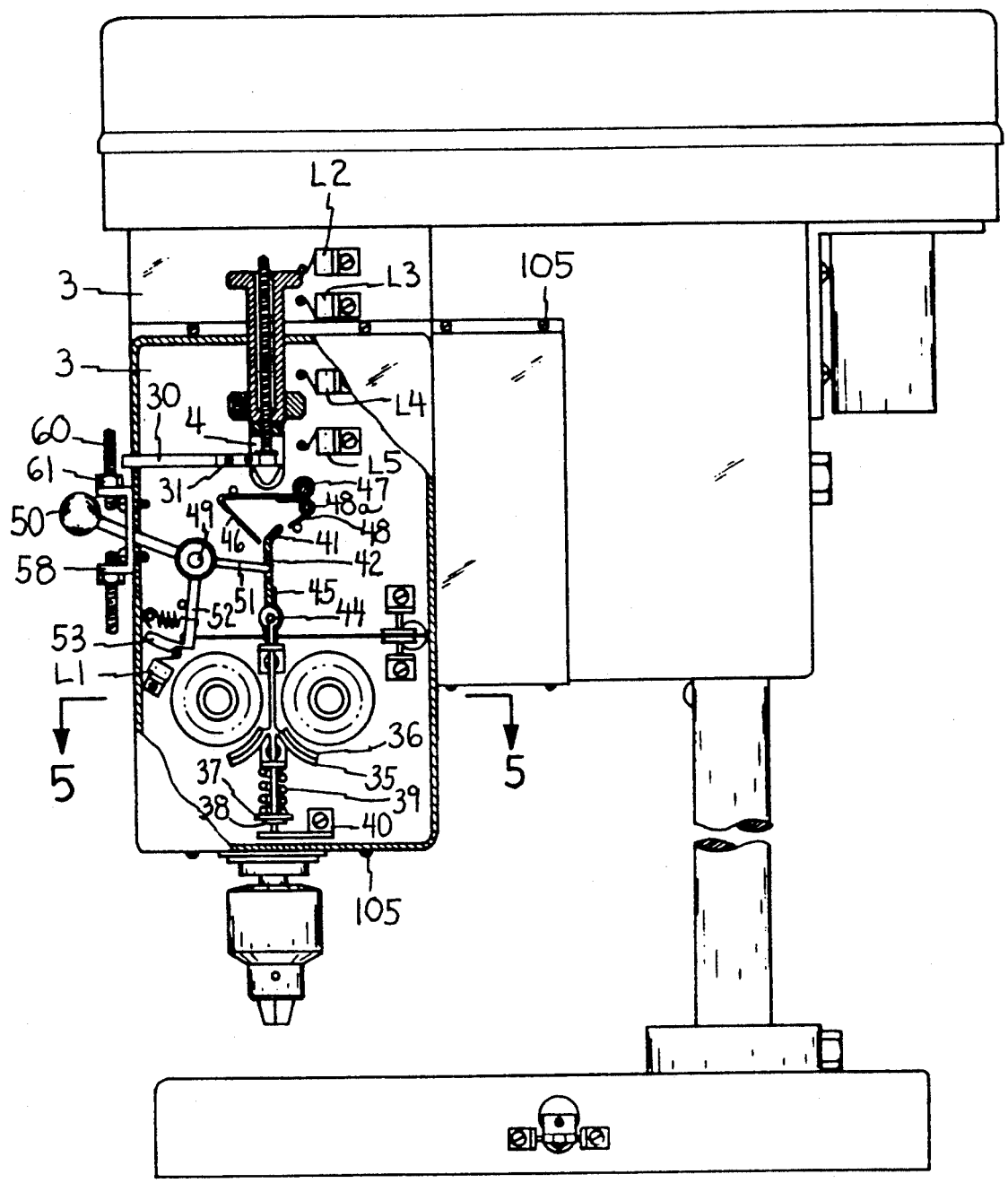
FIG. 4 is a frontal sectional view of the drum type braking means according to the present invention.
Figure 5:
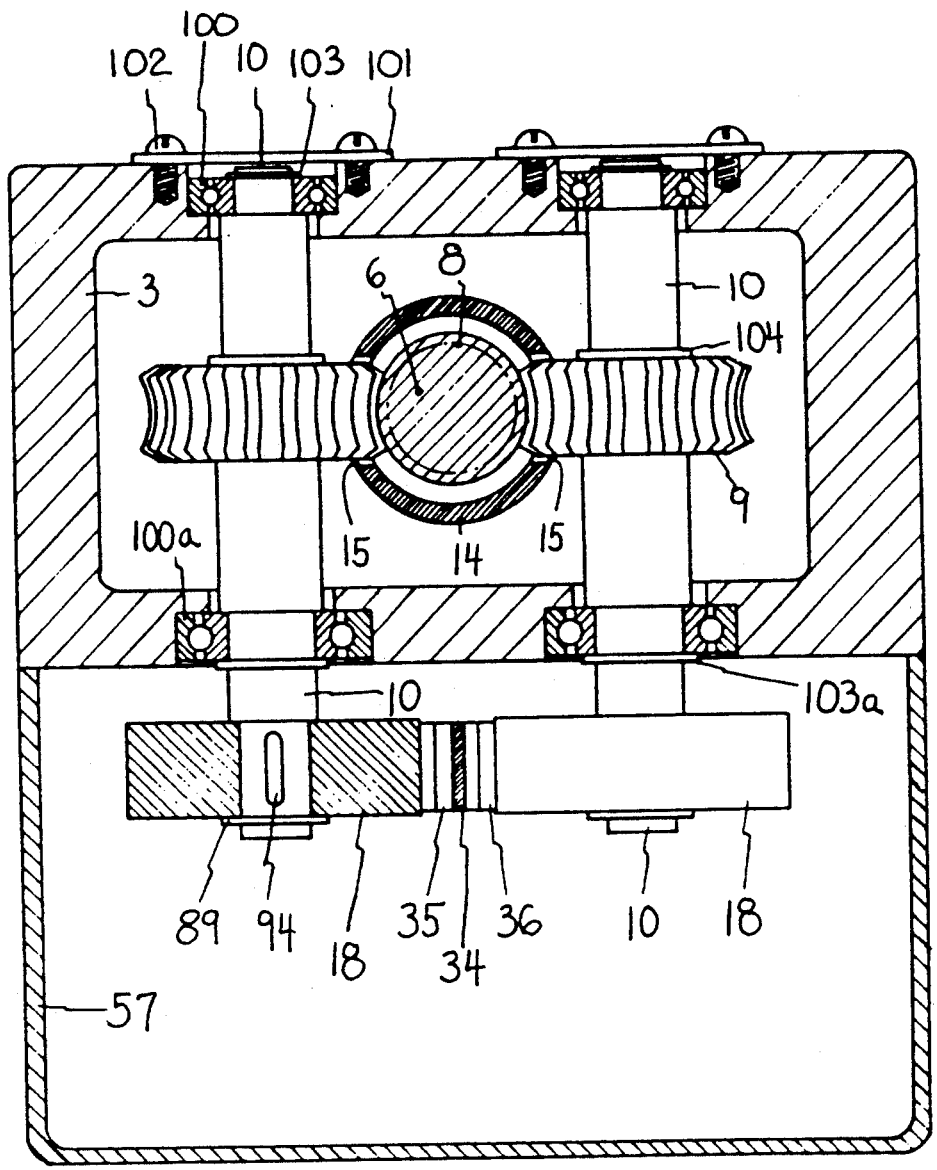
FIG. 5 is a sectional view taken along the line 5—5 of FIG. 4.
Figure 7:
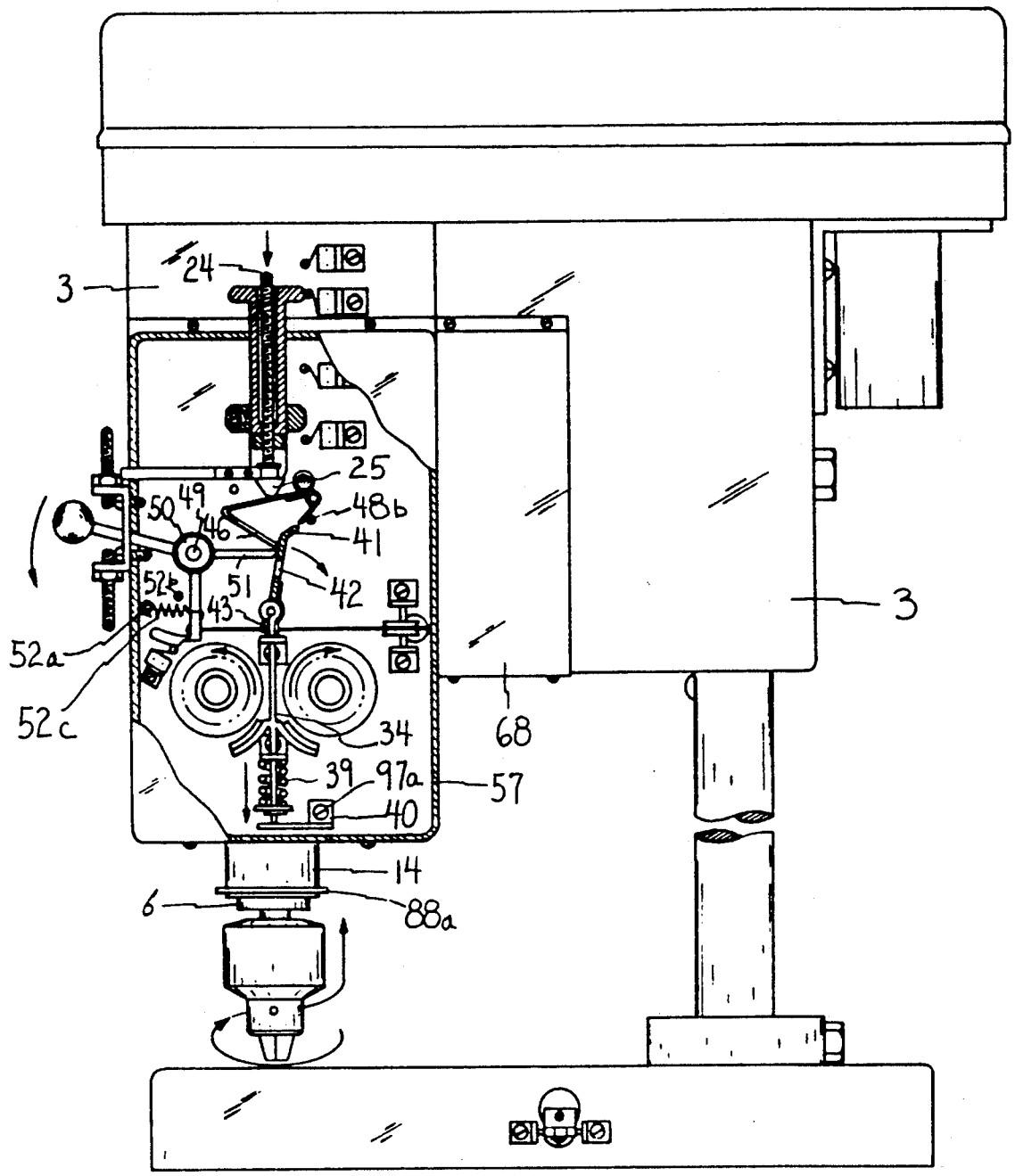
FIG. 7 is a frontal view of the drum type braking means of the present invention showing a state in which the drum type braking means is being automatically detached.
Figure 8:
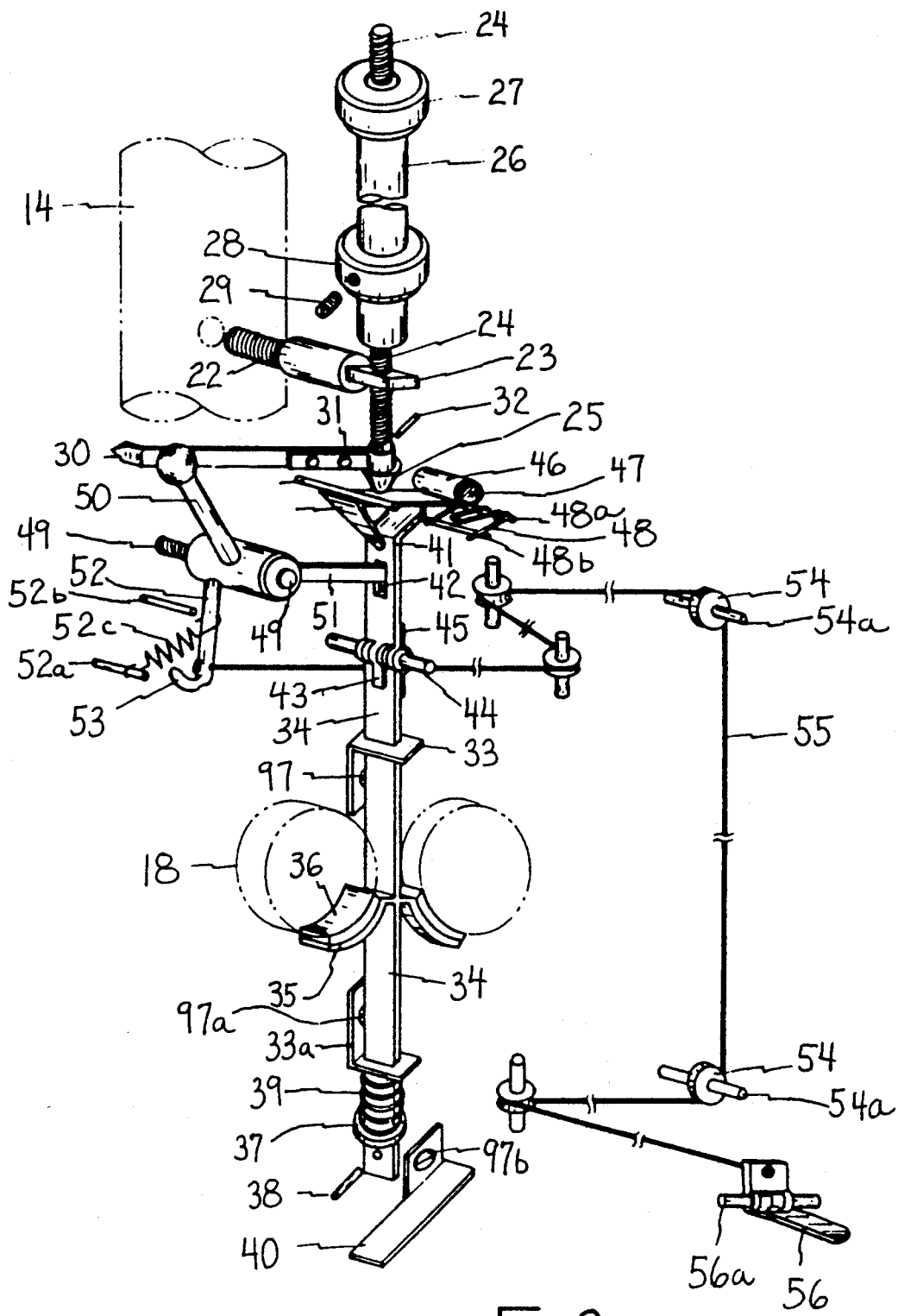
FIG. 8 is an exploded perspective view of the drum type braking means according to the present invention.
Figure 9:
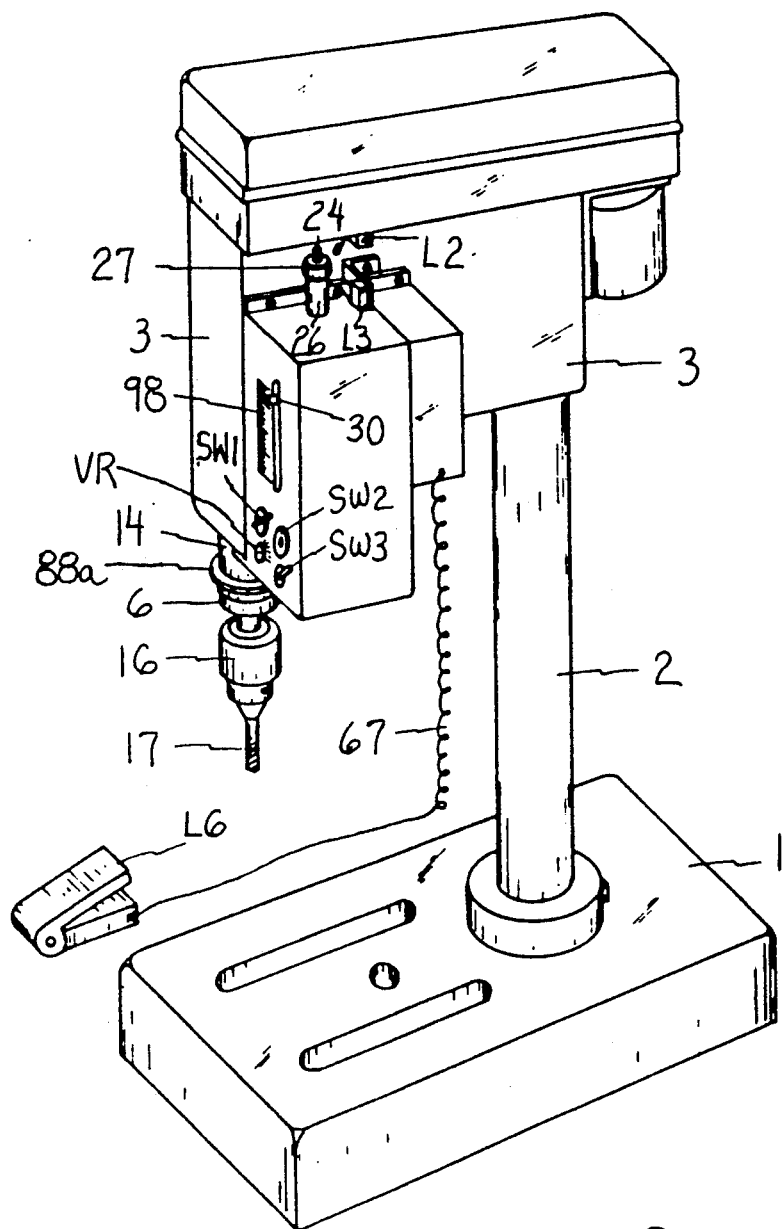
FIG. 9 is an external perspective view showing a state in which an electronic braking means is used according to the present invention.
Figure 10:
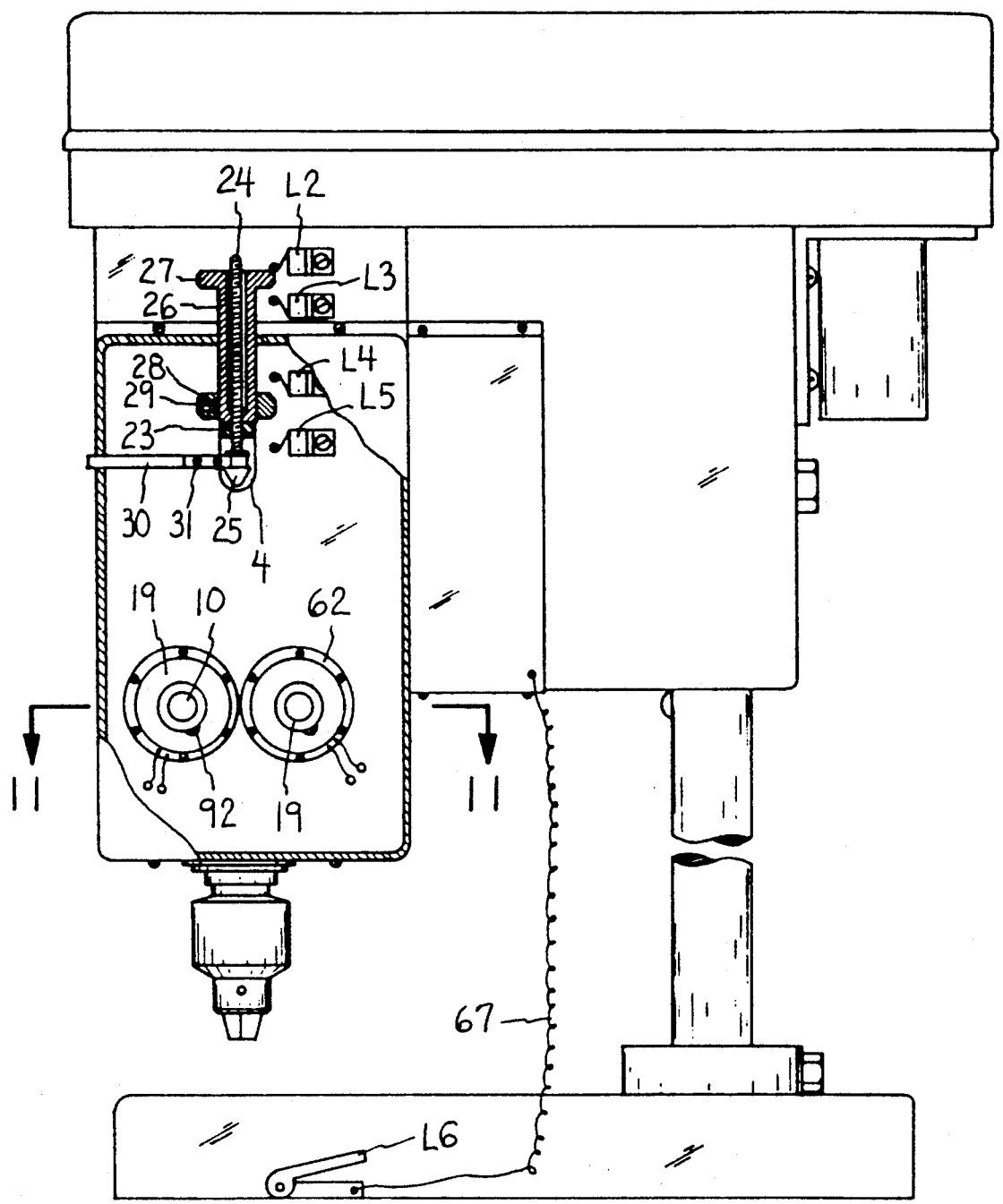
FIG. 10 is a frontal view of the electronic braking means according to the present invention.
Figure 11:
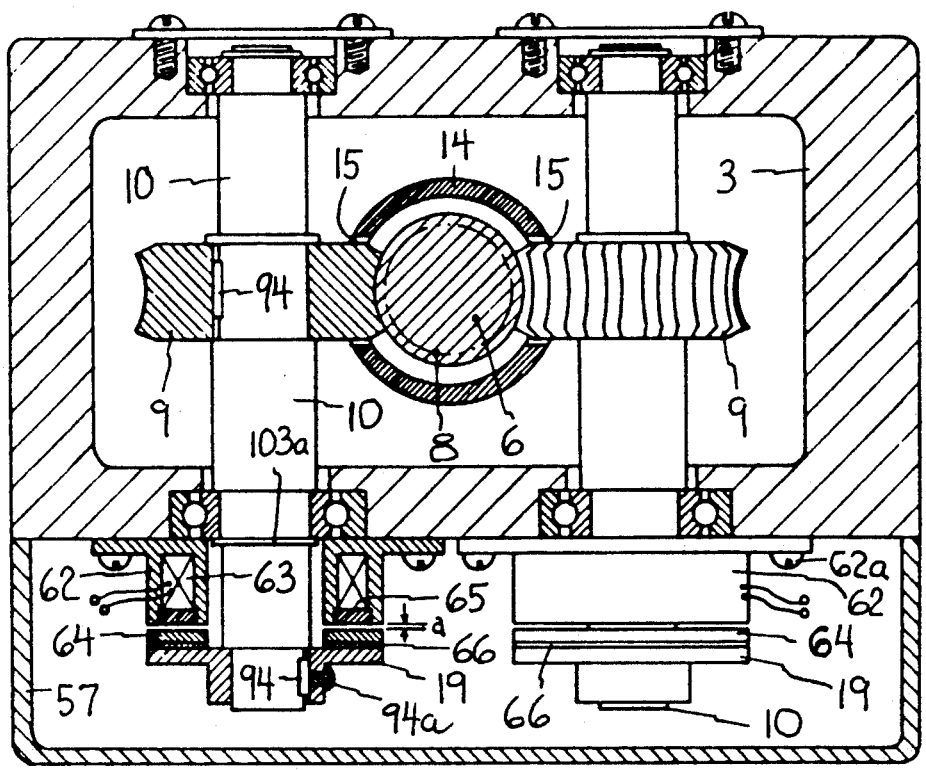
FIG. 11 is a sectional view taken along the line 11—11 of FIG. 10.

If the handle 50 is further pressed until the vertically movable tube 14 has a position as shown in FIG. 7, then the cone 25 of the adjusting bolt 24 presses the actuation lever 46, so that the hanger hole 42 of the oscillating plate 41 should depart from the branch rod 51, and that the actuation bar 34 should come down owing to the elastic force of the compression coil spring 39, thereby releasing the braking force. At the same time, the spindle 6 returns to the position of FIG. 4 owing to the restoring force of the compression coil spring 12. Further, the spindle 6 can be made to come down through the above described process by pressing the pedal 56, and holes can be drilled to a certain uniform depth by properly setting the adjusting bolt 24 as described in detail above referring to FIG. 7.

The rollers 54 and wires 55 are combinedly connected between the branch rod 52 and the pedal 56, but the same purpose can be achieved even by using an ordinary cable having wires therein.

Referring to FIG. 12, if the shifting switch SW1 is shifted to a tapping mode, if the push button SW2 is pressed, and if the manual handle 50 is pulled down, then the spindle 6 repeats ascending and descending movements within the range set by means of the limiting switches L2 and L3. If the manual handle is released, the spindle 6 is lifted to the original position. Under this condition, if the elongate bolts 60 which are coupled with the upper and lower faces of the adjusting plate 58 are properly adjusted to secure the manual handle 50 to an arbitrary position, then the spindle 6 can be made to ascend and descend repeatedly at a constant speed.

<Example 2>

The electronic braking means C will be described below.

Referring to FIG. 13, if the shifting switch SW1 is set to a drilling mode, then the forward revolution magnet switch $M_1$ is activated, and the motor 5 is started. Along with this, the spindle 6 revolves, and then, if the pedal switch L6 is pressed, or if the snap switch SW3 which is attached on the braking means box 57 is turned on, a dc power is supplied to the two electronic brakes MB. Consequently, the armature hub 19 is braked, and the spindle 6 comes down. Then, if the pedal switch L6 is released, and if the snap switch SW3 is turned off, the spindle 6 is restored to the original position owing to the restoring force of the compression coil spring 12.

Referring to FIG. 13, if the shifting switch SW1 is set to a tapping mode, and if the push button switch SW2 is pressed, the magnet switch $M_1$ is energized, so that the motor 5 should be driven. Under this condition, if the pedal switch L6 or the snap switch SW3 is turned on, a dc power is supplied to the electronic brakes MB in the same way as the drilling operation, so that the armature hub 19 should be braked. Under this condition, the spindle 6 repeatedly and automatically moves up and down within the range of the limiting switches L2 and L3 of the electric circuit.

The braking of the armature hub 19 can be adjusted by adjusting the voltage and current of the dc power which is supplied to the coil 63, and the variable resistor VR is for performing such a function. That is, the variable resistor VR can perform indirect adjustments, and, when a small hole is drilled or tapped, only one part of the electronic braking means, which consists of a pair of worm wheels 9 and electronic brakes MB, can be used.

<Example 3>

The disc braking means D will be described below.

This is the simple case where only a single worm wheel 9 is used. If the handle 71 is pulled forward as shown in FIG. 14, the movable teeth portion 70 advances toward the disc hub 20, so that the side of the movable teeth portion 70 should press the lining 73, thereby producing a braking effect. If the lever 76 of FIG. 15 is pushed down, the disc brake 74 presses the lining 73, thereby also producing a braking effect.

<Example 4>

The band braking means E will be described below.

This is also the simple case where a single worm wheel 9 is used. If the lever 82 is pulled down in the direction of the arrow mark, the lining 80 attached on the band 79 presses the outer circumferential surface of the band hub 21, thereby producing a braking effect.

As can be seen in the above described examples, the effects of the device of the present invention are as follows.

First, the effects obtained in the drilling operation are as follows.

Conventionally, when drilling a large hole, there is required a large force such that the handle has to be pulled down by hand, and at the same time, it has to be pressed down by the elbow. However, in operating the drilling machine of the present invention, a single finger will be sufficient, and it is also possible to drill holes repeatedly to a uniform depth by properly adjusting the adjusting bolt.

Further, when drilling a deep hole, the trouble of turning the manual handle is avoided, and the operation can be performed in a simple manner only by pressing the handle or by treading on the pedal. Further, when using the pedal, the two hands are free to use for other purposes such that the work piece can be held by the hands, that a cooling fluid can be applied by the hands, or that drilling chips can be removed by the hands.

During a drilling operation, if the drilling tool does not advance by being engaged by a large impediment, then the lining of the braking means is slipped, so that the spindle should not come down further, but that the spindle should revolve at a fixed level, thereby protecting the drilling tool.

Further, the ascending or descending speed of the spindle can be adjusted in a simple manner by adjusting the pressing force for the manual handle or by adjusting the variable resistor, and therefore, no separate facility is required for controlling high speed operations.

Second, the effects obtained in the tapping operations are as follows.

Conventionally, a tapping operation is performed by bringing the tapping tool down to the work piece, and therefore, automatic repetitions of the tapping operation are not possible. If an automatic feature is to be provided, a separate facility is required, and, when forming threads, a large tolerance is required. However, according to the device of the present invention, the ascending and descending speed of the spindle can be arbitrarily adjusted, and therefore, precise tolerances can be satisfied. Further, the spindle can move up and down automatically and repeatedly, and therefore, if an electric circuit is provided, automatic tapping operations can be easily achieved.

Third, the device of the present invention can be widely applied to other machines such as boring machines, milling machines and other precision machine tools.

Further, as for the horizontal shaft of the worm wheel which is meshed with the worm of the spindle of the present invention, only a single shaft can be used. Such modifications should come within the scope of the present invention.

What is claimed is:

1. An automatic spindle moving device for a tapping/drilling machine, including: a drill head portion A for revolving by receiving power from a motor; a vertically movable tube 14 inserted into the front portion of said drill head A in such a manner as to move up and down within it; a spindle 6 coaxially installed within said vertically movable tube 14; a depth adjusting rod 22 passing through a vertically elongate slot 4 formed on a side of a drill head 3; and an adjusting bolt 24 threadably secured to a threaded portion 23 of the other end of said depth adjusting rod 22, said adjusting bolt 24 having a cone 25 on the lower end thereof, said device further comprising:
a worm 8 formed on said spindle 6 in an elongate form in the lengthwise direction thereof;
horizontal shafts 10 passing through two vertically elongate slots 15, said slots 15 being symmetrically and oppositely formed on said vertically movable tube 14;
worm wheels 9 fitted to said horizontal shafts 10 in such a manner as to mesh with said worm 8;
an oscillating plate 41 having a hanger hole 42, said hanger hole 42 being for receiving a branch rod 51 of a manual handle 50;
an actuation bar 34 for being moved up and down together with a wing piece 35, said wing piece 35 having a lining 36; and
a drum hub 18 coaxially fitted to said horizontal shaft 10, and for being pressed by said lining 36, thereby producing a braking effect, and forming a drum braking means.

2. The automatic spindle moving device for a tapping/drilling machine as claimed in claim 1, wherein said drum braking means comprises:
said actuation bar 34 attached with said wing piece 35 (including said lining 36);
guide plates 33 and 33a secured to a side of said drill head 3 by means of screws, and for guiding said actuation bar 34 up and down;
a compression coil spring 39 installed on the lower portion of said actuation bar 34 and under said guide plate 33a by means of a washer 37 and a pin 38 so as for said spring 39 to push said actuation bar 34 down to a stopper 40;
an actuation lever 46 fitted to a projected pin 47 and elastically supported by a spring 48, said spring 48 being supported by a projected pin 48a;
said actuation lever 46 being pushed by said cone 25 in order to oscillate said oscillating plate 41;
a supporting piece for supporting said oscillating plate 41;
a spring 45 fitted with a shaft 44 and installed on the upper portion of said actuation bar 34;
an adjusting plate 58 attached on a braking means box 57, said adjusting plate 58 having a vertical hole 59 at the center thereof;
long bolts 60 secured to the upper and lower faces of said adjusting plate 58 in order to set said manual handle 50 to an arbitrary position;
a spring 52c, a branch rod 51 and another branch rod 52 having a pressing protuberance 53 for supporting said manual handle 50;
the other end of said branch rod 51 being inserted into said hanger hole 42 of said oscillating plate 41;
a pedal 56 connected to said branch rod 52 by means of wires 55, said wires passing rollers 54 before connecting said pedal 56;
a limiting switch L1 disposed within the actuation range of said pressing protuberance 53 so as for said drum hub 18 to be braked, thereby forming a drum braking means.

* * * * *